United States Patent

[11] 3,587,384

| [72] | Inventor | Hans J. Ditschler<br>Karlsruhe, Germany |
|---|---|---|
| [21] | Appl. No. | 756,742 |
| [22] | Filed | Sept. 3, 1968 |
| [45] | Patented | June 28, 1971 |
| [32] | Priority | Sept. 2, 1967 |
| [33] | | Germany |
| [31] | | P 16 27 364.6 |

[54] GEAR SHAPING APPARATUS
21 Claims, 8 Drawing Figs.

| [52] | U.S. Cl. | 90/7 |
|---|---|---|
| [51] | Int. Cl. | B23f 5/20 |
| [50] | Field of Search | 90/3, 4, 7, 8 |

[56] References Cited
UNITED STATES PATENTS

| 3,021,765 | 2/1962 | Cobb | 90/7 |
|---|---|---|---|
| 3,453,931 | 7/1969 | Campbell | 90/4 |

*Primary Examiner*—Gil Weidenfeld
*Attorney*—Larson and Taylor

ABSTRACT: A gear shaping apparatus wherein the workpiece and a cutting wheel are mounted for rotational movement about their respective axes and for relative movement towards and away from each other. The drive mechanism which rotates the workpiece and the cutting tool includes a control means for varying the relative rotational speed between the workpiece and the cutting wheel. The control means may be operated in response to either the said rotative movement or the said relative movement.

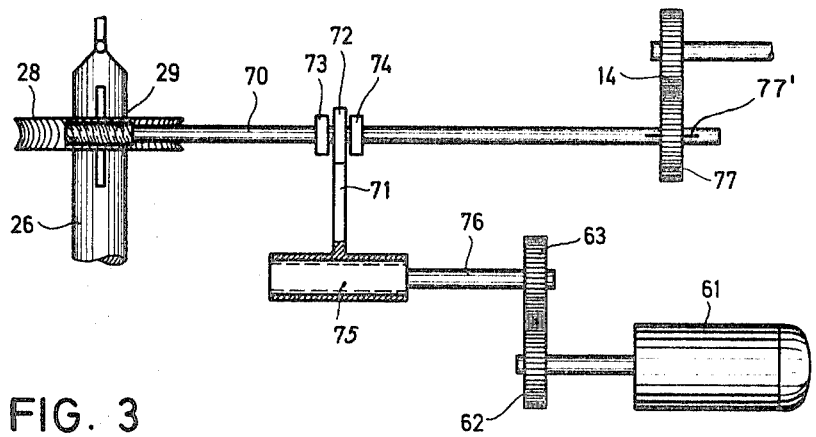
FIG. 3
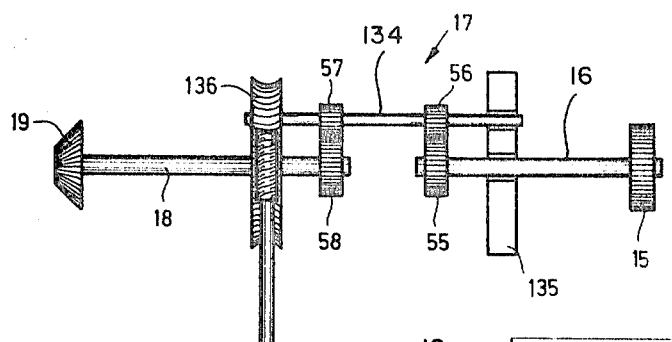
FIG. 2
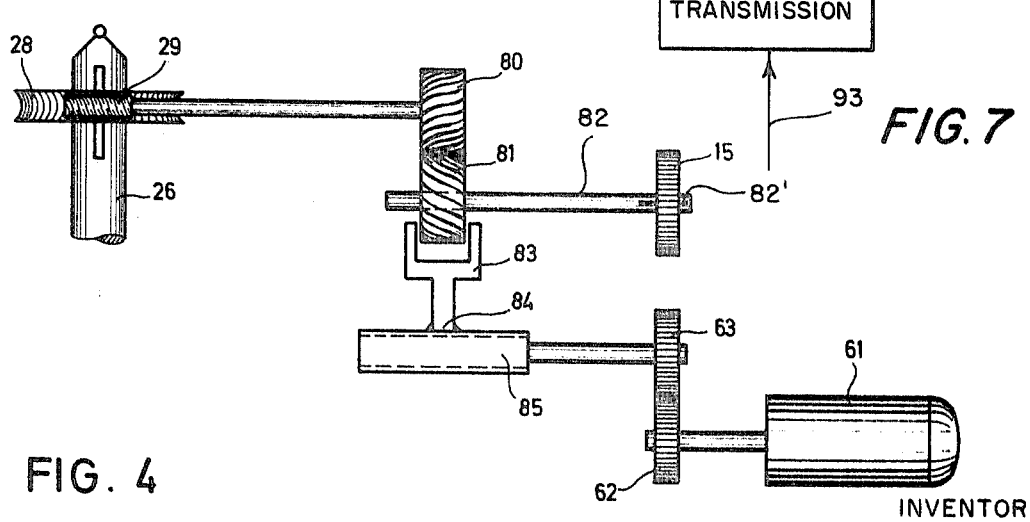
FIG. 4
FIG. 7
INVENTOR
HANS J. DITSCHLER
ATTORNEYS

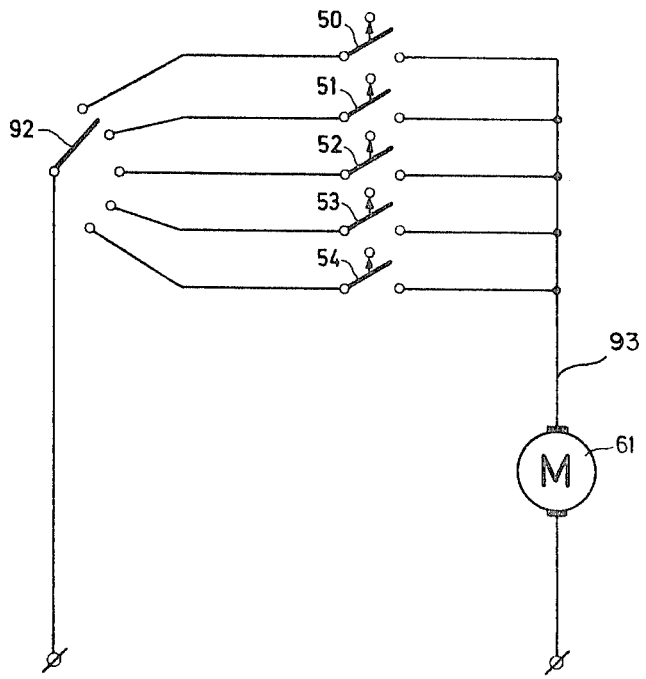
FIG. 6
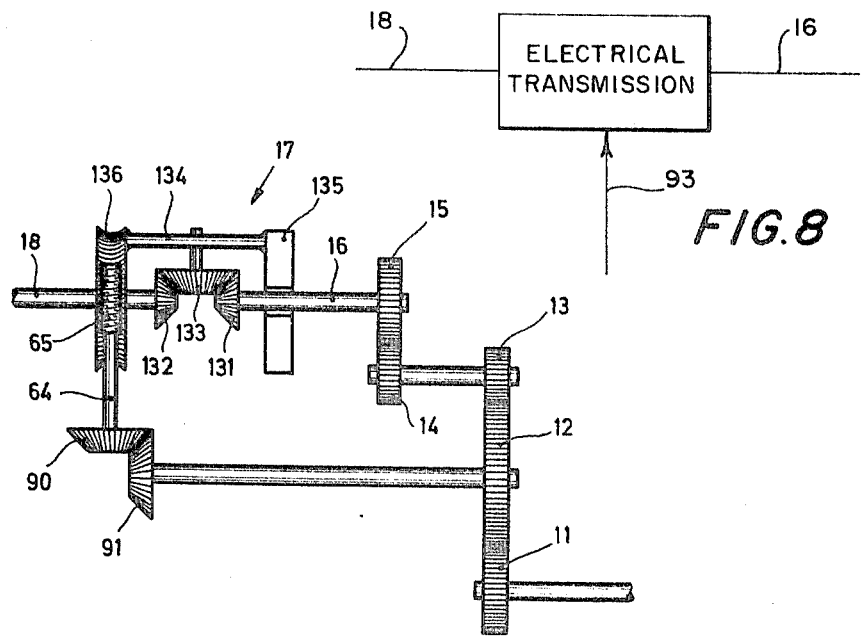
FIG. 8
FIG. 5
INVENTOR
HANS J. DITSCHLER

GEAR SHAPING APPARATUS

BACKGROUND

This invention relates to the production of gears and the like, and in particular it relates to an apparatus for shaping gears by cutting gear teeth.

It is known to produce gears by rotating a workpiece to be formed into a gear relative to a rotating cutting tool or cutting wheel by applying the cutting wheel to the workpiece in both the radial and the axial direction of the latter while rotating the workpiece and the cutting wheel in opposite directions. When cutting external gear teeth the distance between the said axes is determined by the sum, and when cutting internal gear teeth the distance is determined by the difference of the pitch circle radii. Conversely, of course, the workpiece can be moved towards and away from the cutting wheel, as the axis of the latter remains stationary. Suitable means such as a gear train or the like are provided between a drive means or several drive means and the workpiece and the cutting wheel for rotating the latter. Normally the ratio of the rotative speeds of the workpiece and the cutting wheel is equal to the reciprocal of the ratio of the number of teeth, or of the pitch circle radii of the workpiece and the cutting wheel. During the production of the gear teeth it is also necessary to impart axial movement to the cutting wheel relative to the workpiece. Thus, during a working stroke the two wheels are engaged while rotating in opposite directions and while moving axially relative to each other. After each working stroke, the cutting wheel and the workpiece are separated from each other so that the cutting wheel can return to its initial position during a return stroke without contacting the workpiece. The procedure for separating the workpiece and the cutting wheel depends upon the type and shape of the teeth being produced. For example, the relative movement between the wheels may take place along the line connecting the axes of the two wheels. Alternatively, the separation movement may take place along a line formed at an angle to the said connecting line in order to impart a particular shape to the teeth being formed on the workpiece.

Where a relatively large depth is desired between the teeth of the gear, it may be necessary to form the gears in several rather than a single rotation of the workpiece. For each rotation of the workpiece the cutting wheel or the workpiece is moved towards the other wheel through a suitable cam or the like so that the axial distance between the cutting wheel and the workpiece is changed either step wise or continuously from an initial depth to a larger depth.

Thus, the production of gear teeth normally involves a rolling engaging movement between the cutting wheel and the workpiece together with selected relative movement of the workpiece and the cutting wheel towards and away from each other.

In known gear shaping apparatus, the rolling movement between the cutting wheel and the workpiece is produced by a rolling gear train with a fixed transmission ratio which is calculated from the ratio of the number of teeth of the gear elements and from the ratio of the pitch circle radii of the cutting wheel and the workpiece. This fixed transmission ratio provides a pure rolling movement of the pitch circles of the cutting wheel and the workpiece on each other.

However, for forming a particular type of gear, it is necessary to use a specialized machine which is normally quite complicated and which is limited in its use to the formation of the said particular type of gear teeth. For example, gear teeth which narrow in the axial direction are obtained by conical movement of the work wheel by inclining the axis of the cutting wheel relative to that of the workpiece. Convex tooth flanks are produced by a relative radial motion along corresponding guide surfaces between the cutting wheel and the workpiece. In some cases the formation of a particular type of gear requires a very specific relative movement between the workpiece and the cutting wheel during the step of separating the two wheels from each other. Further relative adjustments between the workpiece and the cutting wheel are necessary to correct for such factors as distortion due to hardening. In presently known machines extensive work is required to perform such adjustments. In some cases the cross sectional area of the tooth space is to be divided between preceeding and succeeding tooth flanks of the cutting wheel, for which tangential relative movement is required between the cutting wheel and the workpiece.

It is evident from the above that the production of gears requires numerous relative movement between the workpiece and the cutting wheel in addition to pure rolling movement. Consequently, there exists a need for providing an arrangement wherein such movements can be provided both efficiently and economically.

SUMMARY OF THE INVENTION

Thus, it is a purpose of this invention to overcome the disadvantages of previous gear shaping apparatus by providing an arrangement which is both simple and readily adaptable for the various types of adjustments necessary to produce the various types of gear teeth.

According to the present invention this purpose is carried out by providing a control means operable in conjunction with the means which cause rotational movement of the workpiece and/or the cutting wheel for the purpose of varying the relative rotational speeds between the workpiece and the work wheel during various stages of operation of the apparatus.

This control means can take a number of different forms such as an additional overriding drive means applied to the cutting wheel and/or the workpiece, a separate drive means for each of the workpiece and the cutting wheel wherein one of the drives would include means for varying the speed, a hydraulic, electrohydraulic or electrical variable transmission means between the drive means and the workpiece and/or the work wheel, or a mechanical variable transmission means between the drive means and either the workpiece or the cutting wheel.

However, in a preferred embodiment of the invention, suitable gear t4ains are provided between one or more drive means and the workpiece and the cutting wheel. A variable speed mechanical transmission is then superimposed upon one of these gear trains, preferably the gear train leading to the cutting wheel, for varying the speed of rotation of the cutting wheel.

For example, the superimposed gear could include, in addition to an input gear and an output gear (both of which would be a part of one of the gear trains) a third movable gear member whose movement is superimposed either additively or subtractively on the movement of the input member relative to the movement of the output member. This superimposed gear arrangement could be either a spur or a bevel wheel differential gear system as commonly employed in automotive construction. The said third gear member is formed as a planatary wheel carrier which carries an intermediate wheel that is positively connected to the input and output gears. With such a differential gear, the ratio of rotation between the cutting wheel and a workpiece can be changed continuously or discontinuously in either direction of rotation.

When only limited reciprocating superimposed motion is required, the superimposed gear can take other forms such as, for example, a worm gear with an axially movable worm or spur gear in which two interlocking gears with oblique teeth are axially movable relative to each other.

A number of different arrangements can be employed to control movement of the said third gear members. According to a preferred form of the invention, the third gear is operated by a reversible step motor which receives electrical impulses to cause a definite angular turn of the third gear in either of the two directions of rotation. Since a worm gear with a large reduction is normally disposed between the superimposed gear or the workpiece, and since the rotary steps of the step motor are also reduced via a worm gear, a practically continuous relative movement between the workpiece and the cutting wheel can be obtained with such a step motor.

The pulses for the step motor would be provided by a known pulse generator, the pulses of which could be generated in response to movement of various parts of the apparatus such as the axial movement of the cutting wheel, the separating movement of either the cutting wheel or the workpiece, the feeding movement of the cutting wheel or workpiece, or the rotary movement of either the cutting wheel or the workpiece.

By controlling the relative speeds of the workpiece and cutting wheel in response to the axial movement of the cutting wheel, it is possible to vary the thickness of the teeth in the axial direction or to produce convex, that is longitudinally bulging, tooth flanks. Also, by varying the relative speeds of the workpiece and cutting wheel at the end of the working stroke and by separating the workpiece and cutting wheel along a line formed at an angle to the line connecting the two axes, it is possible to produce teeth which extend at an angle to the axis of the workpiece.

To shape gears having a prime number of teeth for which no change gears are available, a continuous motion of the rolling gear trains is provided, wherein the superimposed gear rotates in response to rotation of the workpiece. That member of the superimposed gear which normally changes the rotation speed ratio between the workpiece and the cutting wheel will be driven by a gear system corresponding to the desired prime number, connected to the main drive means of the machine.

Thus, it is a purpose of this invention to provide a new and improved gear shaping apparatus.

It is another object of this invention to provide a simplified versatile gear shaping apparatus.

It is another object of this invention to provide a gear shaping apparatus including a control means for varying the relative rotational speed between the workpiece and the cutting wheel.

Other objects and the attendant advantages of the present invention will become apparent from the detailed description to follow together with the accompanying drawings.

BRIEF DESCRIPTION OF THE DRAWINGS

A preferred embodiment of the invention will now be explained below in detail with reference to the accompanying drawings.

FIG. 2 is a section of a further embodiment, in which the spur gear is used instead of a differential bevel gear.

FIG. 3 shows a portion of a further embodiment, in which the superimposed gear is a worm gear with an axially shiftable worm.

FIG. 4 shows a portion of a further embodiment, in which the superimposed gear is a spur gear with two helical intermeshing spur gears, which are axially shiftable in relation to one another.

FIG. 5 shows a portion of another embodiment, in which the worm drive of the differential gear is driven by the main drive means.

FIG. 6 shows the electric control of the step motor in dependence on the various types of movement of the cutting wheel and/or of the workpiece.

FIG. 7 is a symbolic view of a portion of the apparatus wherein the control means is a hydraulic transmission.

FIG. 8 is a symbolic view of a portion of the apparatus wherein the control means is an electrical transmission.

DETAILED DESCRIPTION OF THE PREFERRED EMBODIMENT

Figure 1:
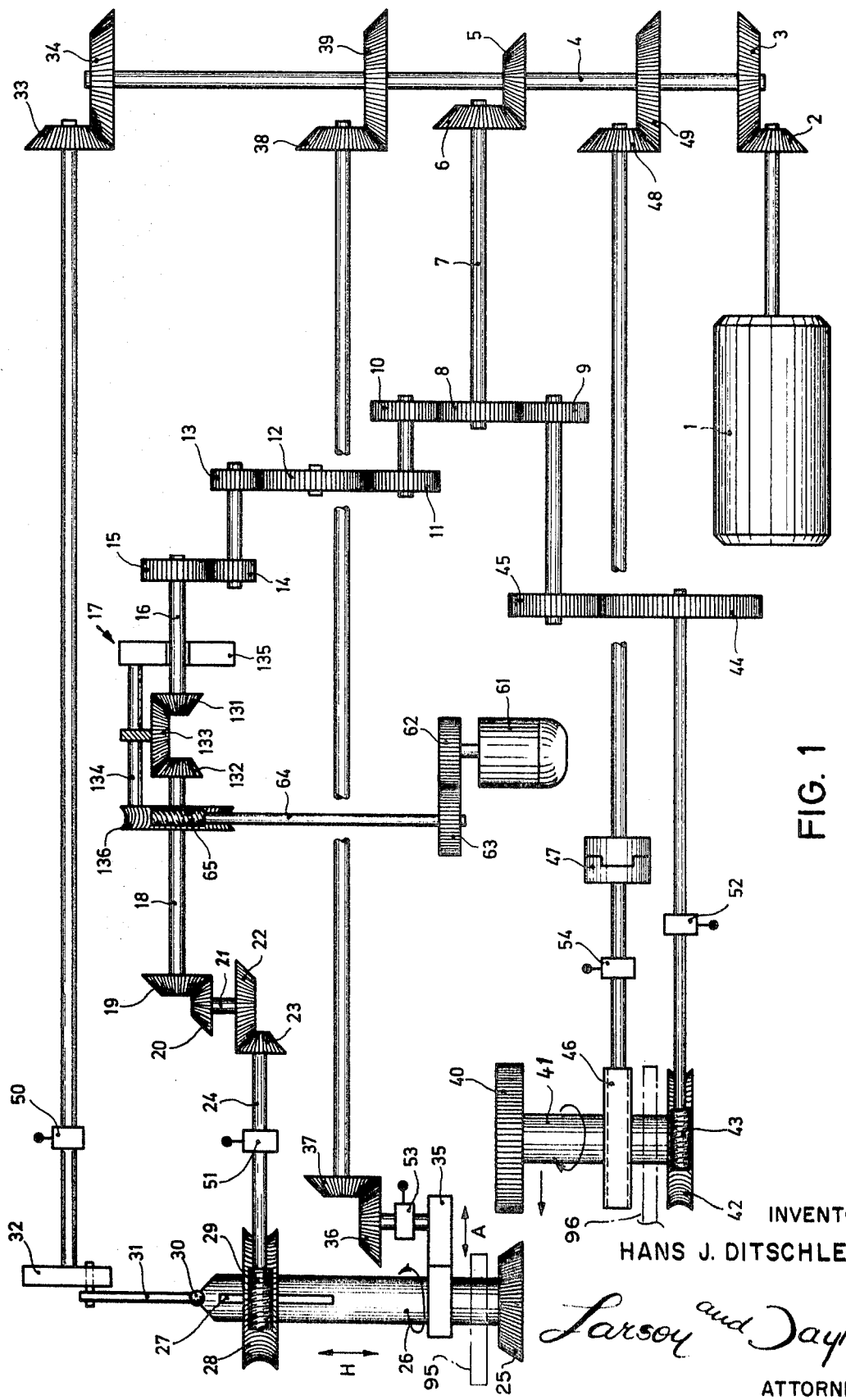
FIG. 1 is a schematic presentation of the gear shaper apparatus constructed in accordance with the present invention and showing the various driving connections.

In the various embodiments, like parts are designated by like numeral throughout. Also, for purposes of convenience, terms such as "vertical," "horizontal" "left," "right," etc. will be used to refer to the apparatus as shown in the drawings. Other orientations of the elements are of course possible.

A driving motor 1 drives a main shaft 4 via bevel gears 2,3 from which the driving force is transmitted via an additional pair of bevel gears 5,6 to a distributor shaft 7. The input shaft 16 of a bevel gear type differential 17 is driven from the shaft 7 via intermediate gears 10, 11, 12, 13, 14, 15; and driven shaft 18 of differential 17 leads via a first pair of bevel gears 19,20, a perpendicular intermediate shaft 21 and a second pair of bevel gears 22,23 to a driving shaft 24 for imparting rotational movement to a cutting wheel 25. The cutting wheel 25 is disposed at the lower end of a cutting spindle 26, which passes through a worm gear 28. Cutting wheel spindle 26 is connected to gear 28 through a longitudinal key 27 so that spindle 26 may rotate with gear 28 but may slide axially relative to gear 28. A worm 29, which is connected to shaft 24, drivingly engages gear 28. A crank assembly 31, mounted in a ball bearing and driven by the main shaft 4 via the bevel gear 33,34 and a crank disc 32, imparts a vertical stroke movement, indicated by the double arrows H, to the cutting wheel spindle 26, in a direction parallel to its axis while the cutting wheel 25 and a workpiece 40 in the case of outside teeth revolve simultaneously in opposite directions to one another in the direction of the rotational arrows, shown in FIG. 1. After every power stroke, the workpiece and the cutting wheel are separated in the direction of the connecting line between the centers of the cutting wheel 25 and the workpiece 40, or at an angle to said line. The cutting wheel 25 then returns to the starting position to commence a new stroke. This separating and starting movement is achieved through a cam disc 35, which is rotated by the main shaft 4 via the paris of bevel gears 36,37 and 38,39.

The drive for rotating workpiece 40, disposed on a shaft 41, includes a worm gear 42 and worm 43, which is in driving connection with the distributor shaft 7 via the intermediate gears 44, 45, 9, 8.

Separating and engaging movement of 25 and 40 can be carried out either by movement of the cutting wheel or movement of the workpiece in the direction of the connecting line between the centers of the two wheels, or at an angle to said line. For this purpose, workpiece 40 includes a spindle drive 46, which is driven by the main shaft 4 via the clutch 47 and a pair of bevel gears 48,49.

The differential gear 7 includes a bevel gear 131 disposed on the input shaft 16 and thus forming the input element of the gear system 17 and a bevel gear 132 disposed on the output shaft 18 arranged coaxially with gear 131 and forming the output element of that gear system 17, which bevel gears are connected positively with one another through a third bevel gear 133 engaging with both bevel gears 131,132. The bevel gear 133 is mounted freely rotatably around an axis directed perpendicularly in relation to the axis of shafts 16,18 on a crossbar or stub-shaft 134, between two carrying discs 135,136 which are freely rotatably mounted on the shafts 16 or 18. The carrying disc 136 is employed as a worm gear and is engaged by a worm 65 which is driven via a worm gear shaft 64 and a pair of spur gears 63,62 from a step motor 61.

As long as step motor 61 does not receive any electric impulses it is stationary as a result of which the yoke or planetary gear carrier, formed by the carrier discs 135,136 and the crossbar 134, is held stationary against rotation in relation to the shafts 16,18. The bevel gear 133, mounted on the crossbar 134 forms only an intermediate gear, through which the rotation of the shaft 16 is transformed into an opposite rotation of the shaft 18.

However, as soon as the step motor 61 received one or more electric pulses, it will turn the worm 65 via the pair of spur gears 62,63 and the shaft 64, which turns the planetary gear carrier 134, 135, 136 with the bevel gear 133 at the pertinent reducing gear ratio. This rotational movement of the planetary gear carrier is superimposed on the rotation of the input shaft 16, depending on it direction of rotation, either additively or subtractively, such that a further peripheral relative movement is added to the rolling movement of the pitch circles of the cutting wheel, achieved through the proper selection of the intermediate gears 11, 12, 13, 14, 15 and of the workpiece 40.

The control of the step motor 61 is accomplished via suitable switching means, for example, pulse switches, which can be selectively operated in dependence upon any one of the various components of movement of the cutting wheel 25 or the workpiece 40 so that the change of relative rotational speed between cutting wheel 25 and workpiece 40 will depend on the pertinent component of movement. If for example, the control of the step motor 61 is to take place in dependence on the vertical movement of spindle 26 then a pulse switch 50 will be operated through the rotation of that shaft connecting the bevel gear 33 with the crank disc 32. As shown in FIG. 6 switch 50 connects an electrical source with the step motor 61 through line 93 by the proper selection of switch 92. The step motor 61, and thus the change of relative rotational speed between the workpiece 40 and the cutting wheel 25 may furthermore be controlled by the turning of the cutting wheel 25 or of the work wheel 40. The pulse switch 51 on shaft 24 and the pulse switch 52 on the shaft between the worm 43 and the bevel gear 44 serve this purpose. An impulse switch 53 has been provided on the shaft between the bevel gear 36 and the cam disc 35 to operate motor 61 in dependence upon the separating and starting movement of the cutting wheel 25. If the change of the relative speed between the cutting wheel 25 and work wheel 40 is to take place in dependence upon movement of workpiece 40 towards the cutting wheel 25 then an additional pulse switch 54 is provided between the spindle 46 and the clutch 47. Through operation of a selective switch 92 the desired electrical control circuit can be closed to close a circuit from a power source through line 93 to motor 61.

In the embodiment of the invention as described above, the control means has taken the form of a bevel gear type differential. However, the means for varying the relative rotational speed between the cutting wheel 25 and the workpiece 40 may take may different forms. For example, it could take the form of a different type of differential, of a mechanical arrangement other than a differential, a hydraulic transmission, an electric transmission, etc.

For example, FIG. 2 shows another embodiment of the differential 17 wherein input and output shafts 16 and 18 have connected thereto spur gears 55 and 58, respectively, while a pair of additional spur gears 56 and 57 are mounted on the crossbar 134. The spur gears replace the bevel gears 131, 132 and 133 of FIG. 1.

The change of rotational direction of the output shaft as compared to the embodiment according to FIG. 1, can be balanced out by an additional spur gear or by the reversal of the worm 29.

FIGS. 3 and 4 show still other arrangements for varying the speed of cutting wheel 25 relative to the workpiece 40. In FIG. 3 this variation is brought about by axial movement of the worm 29. In FIG. 3 the gear 14 engages a gear 77 which is connected to a shaft 70 by means of a key 77' such that the shaft 70 turns with the gear 77 but slides axially relative thereto. The shaft 70 includes two abutments 73 and 74. The step motor 61, acting through gears 62 and 63 in shaft 76, moves a member 75 in the axial direction (left or right in FIG. 3) such that a member 72, connected to member 75 by a rod 71, engages abutments 73 or 74 to move the worm 29 to the left or the right respectively.

In the arrangement of FIG. 4 the worm 29 is mounted on a shaft which is in turn connected to a beveled spur gear 80 which meshes with a second beveled spur gear 81 which is fixed onto a shaft 82. This shaft 82 is connected to gear 15 by a key 82' through which the gear 15 turns the shaft 82 but permits axial movement of the shaft 82 relative to the gear 15. In this embodiment the additional rotative movement is provided by shifting the gear 81 relative to the gear 80. To provide this shifting of the gear 81, the step motor 61 is connected through gears 62 and 63 to a longitudinally moveable gear arrangement (such as worm and rack) 85 which in turn moves the yoke 83 to the right and left (as shown in FIG. 4) to vary the position of gear 81 relative to gear 80.

The control means for varying the relative rotational speed between the cutting wheel 25 and the workpiece 40 is not limited merely to those mechanical arrangements described above. For example, elements such as 95 and 96 (shown symbolically in dotted lines in FIG. 1) may be provided to act directly in a tangential direction upon the spindle 26 or the shaft 41 to override the main drive means and thereby vary the speed of the spindle 26 or shaft 41.

In another possible arrangement the gears 10 through 15 may be omitted and the differential 17 may be driven solely by power derived from the motor 61. In this case the speed of the motor 61 would be varied as desired to provide the necessary and desired relative rotational speed between the cutting wheel 25 and the workpiece 40.

Referring to FIG. 7, the control means could take the form of a variable speed hydraulic transmission connected, for example, between the shafts 16 and 18, whereby the input to output ratio of the variable speed hydraulic transmission could be supplied directly from line 93 (see FIG. 6) thereby omitting the motor 61. Variable speed hydraulic transmissions are known per se and need not be discussed in further detail.

As illustrated in FIG. 8, the control means could be an electrical transmission connected, for example, between shafts 16 and 18, and operated by electrical current from line 93 (see FIG. 6). For example, the electrical transmission could be two separate E-motors, coupled with one another via an electrical shaft or a data installation.

If the primary gears are to be thrust gears, then as shown in FIG. 5, the step motor with the pair of spur gears 62,63 is replaced by a gear, in this case a pair of bevel gears 90,91 which is in driving connection with gear 11 which is driven by the main shaft 4 and whose transmission ratio corresponds to the desired primary number of the teeth of the work wheel.

In FIG. 6 the shifting diagram of the step motor 61 and of the pulse switches 50, 51, 52, 53 and 54 has been shown. The pertinent pulse switch can be connected electrically with the step motor 61 by way of a selecting switch 92, as a result of which the change of relative rotational speed between cutting wheel 25 and workpiece 40 can be made dependent upon the desired operation of the apparatus.

Although the invention has been described in considerable detail with respect to preferred embodiments thereof, it should be apparent that the invention is capable of numerous modifications and variations which are apparent to those skilled in the art.

I claim:

1. A gear shaping apparatus comprising a means for holding a work piece to be shaped into a gear, a cutting tool having a cutting edge, means for providing relative reciprocation between the cutting tool and the work piece, wherein said cutting edge, during a stroke of the cutting took, cuts a tooth profile of the gear through the complete axial width of the gear, rotating means for providing relative rotational movement between the cutting tool and the work piece, and a control means for varying the relative rotational speed between the work piece and the cutting tool during the cutting stroke as the cutting tool cuts through the axial width of the gear, and a separate drive means responsive to movement of at least one of said work piece and said cutting tool for operating said control means.

2. An apparatus as claimed in claim 1 wherein said rotating means comprises at least one drive means and a first gear train connecting said drive means to the workpiece to rotate the workpiece, and a second gear train connecting said drive means to the cutting tool to rotate the cutting tool, and wherein said control means comprises a variable gear arrangement operatively connected to one of said gear trains to vary the speed of rotation of that gear train and thereby vary the relative rotational speed between the workpiece and the cutting tool during the cutting stroke.

3. An apparatus as claimed in claim 2 wherein said variable gear arrangement is a differential gear comprising an input gear, an output gear and an intermediate gear operatively engaged with said input and output gears and said separate drive means including means for controlling rotational movement of said intermediate gear to control the speed of rotation of its respective gear train.

4. An apparatus as claimed in claim 3 wherein said input and output gears are coaxial opposed bevel gears and said intermediate gear is a bevel gear mounted on a yoke which is freely rotatable about the common axis of said input and output gears.

5. An apparatus as claimed in claim 3 wherein said input and output gears are coaxial, opposed spur gears and said intermediate gear comprises a pair of coaxial intermediate spur gears fixed on a common stub shaft, one intermediate gear engaged with each of said first and second gears, said stub shaft being mounted for free rotational movement about the common axis of said input and output gears.

6. An apparatus as claimed in claim 2 wherein the one of said gear trains including the variable gear arrangement includes a shaft having a worm mounted thereon, a helical gear mounted on said shaft, and a second helical gear drivingly engaging the first said helical gear, and a worm gear in operative engagement with said worm, and wherein said separate drive means includes means for moving said helical gears axially with respect to each other.

7. An apparatus as claimed in claim 2 wherein the one of said gear trains including the variable gear arrangement includes a shaft having a worm mounted thereon, and a worm gear in operative engagement with said worm and wherein said separate drive means includes means for moving the worm axially along a line tangential to the worm gear.

8. An apparatus as claimed in claim 2, said separate drive means including a variable speed step motor operatively connected to operate the variable gear arrangement to control the relative rotational speed between the workpiece and the cutting tool.

9. An apparatus as claimed in claim 8 wherein the cutting tool is a cutting wheel and its axis of rotation is parallel to the axis of rotation of the workpiece, and including means for moving the cutting wheel along its said axis relative to the workpiece, and wherein said step motor is operable in response to said relative axial movement of the cutting wheel.

10 An apparatus as claimed in claim 8 wherein the axes of rotation of said cutting tool and said workpiece are substantially parallel and including means for moving the workpiece axis towards and away from the cutting tool axis, and wherein said step motor is operable in response to said movement of the workpiece axis.

11. An apparatus as claimed in claim 8 wherein the axes of rotation of said cutting tool and said workpiece are substantially parallel, and including means for moving the cutting tool axis towards and away from the workpiece axis, and wherein said step motor is operable in response to said movement of the cutting tool axis.

12. An apparatus as claimed in claim 8 wherein said step motor is operable in response to rotational movement of the workpiece.

13. An apparatus as claimed in claim 8 wherein said step motor is operable in response to rotational movement of the cutting tool.

14. An apparatus as claimed in claim 8 wherein the cutting tool is a cutting wheel and its axis of rotation is parallel to the axis of rotation of the workpiece, and including means for moving the cutting wheel along its axis relative the workpiece, means for moving the cutting wheel axis towards and away from the workpiece axis, means for moving the workpiece axis towards and away from the cutting wheel axis, and means for rendering the operation of the step motor responsive to any one of the following: (a) axial movement of the cutting wheel relative to the workpiece, (b) rotational movement of the cutting wheel, (c) rotational movement of the workpiece, (d) movement of the cutting wheel axis towards or away from the workpiece axis or (e) movement of the workpiece axis towards and away from the cutting wheel.

15. An apparatus as claimed in claim 8 comprising two separate drive means, one for driving each gear train, wherein the drive means driving that gear train having the variable gear arrangement is the said step motor.

16. An apparatus according to claim 1 wherein the said control means for varying the relative rotational speed comprises a variable speed hydraulic transmission capable of being operatively connected to either the workpiece or the cutting tool to vary its speed of rotation.

17. An apparatus as claimed in claim 1 wherein the said control means for varying the relative rotational speed comprises a variable speed electric transmission capable of being operatively connected to either the workpiece or the cutting tool to vary its speed of rotation.

18. An apparatus as claimed in claim 1, wherein the said control means for varying the relative rotational speed includes a means arranged to act on either one of the cutting tool or the workpiece in a tangential direction.

19. An apparatus as claimed in claim 18, wherein the said rotating means comprises at least one drive means and a first gear train connecting said drive means to the workpiece to rotate the workpiece, and a second gear train connecting said drive means to the cutting tool to rotate the cutting tool.

20. An apparatus as claimed in claim 18, wherein the last said means comprises a means for acting upon the cutting tool in the tangential direction.

21. An apparatus as claimed in claim 18, wherein the last said means includes means for acting upon the workpiece in the tangential direction.